(12) United States Patent
Stoll et al.

(10) Patent No.: US 8,454,232 B2
(45) Date of Patent: Jun. 4, 2013

(54) PLUG-IN SENSOR FOR MEASURING AT LEAST ONE PROPERTY OF A FLUID MEDIUM

(75) Inventors: Oliver Stoll, Reutlingen (DE); Christian Roesser, Grossbottwar (DE); Joerg Engelhardt, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 472 days.

(21) Appl. No.: 12/733,525

(22) PCT Filed: Jul. 23, 2008

(86) PCT No.: PCT/EP2008/059630
§ 371 (c)(1),
(2), (4) Date: Jun. 30, 2010

(87) PCT Pub. No.: WO2009/033868
PCT Pub. Date: Mar. 19, 2009

(65) Prior Publication Data
US 2010/0284437 A1 Nov. 11, 2010

(30) Foreign Application Priority Data
Sep. 7, 2007 (DE) .......................... 10 2007 042 789

(51) Int. Cl.
*G01K 1/00* (2006.01)
*G01K 13/00* (2006.01)
*G01K 7/00* (2006.01)

(52) U.S. Cl.
USPC ........... 374/208; 374/148; 374/163; 374/142; 374/143; 73/866.5

(58) Field of Classification Search
USPC .......... 374/208, 148, 163, 142, 143; 73/866.5
See application file for complete search history.

(56) References Cited

U.S. PATENT DOCUMENTS

| 3,081,631 | A | * | 3/1963 | Switzer, Jr. | 374/148 |
| 3,572,120 | A | * | 3/1971 | Lukas et al. | 374/142 |
| 4,058,787 | A | * | 11/1977 | Ichikawa et al. | 338/22 R |
| 5,667,305 | A | * | 9/1997 | Walker | 374/148 |
| 2006/0222050 | A1 | * | 10/2006 | Byrne et al. | 374/208 |
| 2007/0234818 | A1 | * | 10/2007 | Weppenaar et al. | 73/761 |
| 2011/0247413 | A1 | * | 10/2011 | Vinshtok et al. | 73/431 |

FOREIGN PATENT DOCUMENTS

| DE | 93 13 057 | 1/1995 |
| DE | 197 45 244 | 4/1998 |
| DE | 101 09 095 | 9/2002 |
| DE | 102 43 538 | 3/2004 |
| EP | 0 893 676 | 1/1999 |
| EP | 1518 098 | 3/2005 |
| EP | 1521 061 | 4/2005 |

* cited by examiner

Primary Examiner — Mirellys Jagan
(74) Attorney, Agent, or Firm — Kenyon & Kenyon LLP

(57) ABSTRACT

A plug-in sensor for measuring at least one property of a fluid medium, in particular for use in the coolant circuit of an air conditioning system of a motor vehicle. The plug-in sensor has at least one sensor for detecting the at least one property. Furthermore, the plug-in sensor has at least one sensor body having an external thread for threading the plug-in sensor into a threaded bore hole of a housing. Furthermore, the plug-in sensor includes a sealing surface for sealing an inner space of the housing against an outer space. The external thread has at least two threaded sections: a first threaded section including at least one continuous thread, and a second threaded section including at least one interrupted thread, at least one interruption of the at least one interrupted thread forming at least one blow-out groove.

11 Claims, 2 Drawing Sheets

PLUG-IN SENSOR FOR MEASURING AT LEAST ONE PROPERTY OF A FLUID MEDIUM

FIELD OF THE INVENTION

The following description of the present invention relates specifically to applications in which a pressure (p) and a temperature (T) are to be measured, which is possible by using combined p-T sensors.

BACKGROUND INFORMATION

Parameters of fluid media, i.e., of gases and/or liquids, for example, must be measured in different industrial fields. Parameters of this type include, for example, a pressure, a temperature, a flow velocity, a density, or similar physical and/or chemical properties or parameters of the fluid medium.

One important exemplary application of sensors of the above-mentioned type are pressure and temperature sensors for air conditioning systems. In air conditioning systems, the heat of evaporation of a coolant is normally used for cooling air (or another medium to be cooled). The coolant is then compressed in a compressor and thus liquefied. The coolant is heated when compressed. The absorbed heat is usually dissipated into the environment again in a gas cooler. The compression operation with the aid of the compressor must usually be controlled in such a way that the operating pressure does not exceed a predefined maximum pressure and the operating temperature does not exceed a predefined maximum temperature. For this purpose, pressure and temperature must be detected. In addition to this exemplary application in air conditioning systems, numerous other exemplary applications of sensors, in particular of pressure and temperature sensors, are known from various fields of the natural sciences and engineering sciences, in particular in process engineering and the automotive industry.

The use of two separate sensors for detecting pressure and temperature represents a considerable degree of complexity, since at least two plugs and several cable bundles must be available. Furthermore, the use of a plurality of individual sensors results in a plurality of sealing points at the interfaces and points of connection between the individual components. Therefore, an effort is made to obtain both pressure and temperature signals via a combined pressure and temperature sensor. Combined pressure and temperature sensors of this type are discussed in EP 1521 061 A2, DE 101 09 095 A1, DE 197 45 244 A1, and EP 0 893 676 A2. EP 1518 098 B1 discusses a similar sensor, which, however, is designed as a pure high-pressure sensor.

For future air conditioning systems used in motor vehicles, conventional R134a air conditioning systems are expected to be replaced by $CO_2$ air conditioning systems, since according to the EU legislation, the coolant R134a previously used in air conditioning systems will be completely prohibited starting in the year 2016. In $CO_2$ air conditioning systems of this type, increased operating pressures and temperature loads occur compared to conventional air conditioning systems, which place completely novel demands for the pressure and temperature loads of the components and sensors. Thus, pressures of up to 140 bar and medium temperatures of up to 180° C. occur during operation. Regarding hermeticity of the systems, leakages of less than 1 g per year are typically required.

The sensors known from the related art often have sealing surfaces and/or other sealing devices for sealing a sensor. The sensors are usually provided with threaded pieces, with the help of which the sensors may be threaded into a housing which receives the fluid medium. In many cases, flattenings are provided on the threads of the threaded pieces which are used as blow-out grooves and facilitate the threading of the sensor into the housing.

These flattenings on the threads have, however, the disadvantage that liquid and/or gaseous corrosive media from the environment may reach the sealing surface via these flattenings. For example, sensors of this type may be used in the engine compartment, so that oils, fats, engine cleaning agents, battery acid, and other types of impurities, which may occur in the surroundings of the engine, may reach and damage the sealing surface, thus reducing the reliability of the seal over the period of operation.

SUMMARY OF THE INVENTION

Therefore, a plug-in sensor is proposed for measuring at least one property of a fluid medium which at least largely avoids the above-described disadvantages of known plug-in sensors. The at least one property of the fluid medium, which may be a gas or a liquid, may include one or more of the above-described physical or chemical properties. In particular, it may be one of the following properties: a pressure, a temperature, a density, a flow velocity, a mass or volume flow rate, or any combination of properties of this type. In particular, the proposed plug-in sensor is suitable for measuring a pressure, a temperature, or a pressure and a temperature. The plug-in sensor may be used, in particular, for applications in the automotive industry, i.e., in particular in applications of measurements in the engine compartment, in the intake manifold, in an air conditioning system, or in other components of a motor vehicle.

A "plug-in sensor" is understood to be any sensor which is able to measure in an inner space of a housing which receives the fluid medium (which rests or flows there, for example). In particular, the plug-in sensor should be suitable for being introduced into an inner space through an opening in this housing. The plug-in sensor may be designed to be finger-shaped in particular.

The plug-in sensor has at least one sensor body having at least one external thread for threading the plug-in sensor into a threaded bore hole in the housing. To seal the inner space of the housing against an outer space, at least one sealing surface is further provided, which seals the plug-in sensor against the housing.

As described above, this seal is particularly sensitive to attack by corrosive gases or liquids from the inner space of the housing, so that it is proposed according to the exemplary embodiments and/or exemplary methods of the present invention to protect this sealing surface using a thread of the plug-in sensor. Accordingly, it is proposed that the external thread of the plug-in sensor be subdivided in such a way that it has at least two threaded sections. Thus, a first threaded section is provided which has at least one continuous thread. "Continuous" thread is understood as a thread which rotates at least 360° without this thread being significantly interrupted, for example, by a blow-out groove.

Minor interruptions, for example, by notches, may, however, be tolerable, in particular if these minor interruptions are covered by a threaded section above or below them. Therefore, also minor interruptions of this type are tolerable and are to be subsumed as "continuous." However, the continuous thread need not be interrupted in any way. The first threaded section having at least one continuous thread thus protects the thread and the sealing surface of the plug-in sensor and the at least one sensor of the plug-in sensor against corrosive media and thus produces the required hermeticity and durability of the plug-in sensor.

Furthermore, in order to make it possible to introduce the plug-in sensor into the housing without problems, at least one second threaded section is provided. It includes at least one interrupted thread, this at least one interruption of the at least one interrupted thread forming a blow-out groove. This at least one blow-out groove, which may have two, three, four, or more blow-out grooves being provided, allows venting when the plug-in sensor is inserted into the housing and thus allows comfortable and smooth threading of the plug-in sensor into the housing. These blow-out grooves may be configured in such a way that they extend essentially (i.e., with a tolerance of +/−5 degrees, for example) parallel to a longitudinal axis of the plug-in sensor.

The at least one second threaded section may be situated between the at least one first threaded section and the sealing surface. In this way, the first threaded section effectively protects not only the sealing surface, but also the second threaded section. This at least one first threaded section may have between one and two continuous threaded sections. This refinement of the exemplary embodiments and/or exemplary methods of the present invention is advantageous in particular in connection with another refinement of the present invention in which the plug-in sensor is manufactured entirely or partly with the aid of a powder metallurgical method, in particular with the aid of a metal injection molding (MIM) method. Thus, in particular, the external thread may be entirely or partly manufactured by the powder metallurgical method, in particular with the aid of the metal injection molding method.

This refinement of the exemplary embodiments and/or exemplary methods of the present invention makes simple and cost-effective mass production in an injection molding process possible. Reworking (e.g., thread cutting) of the component is usually not required. When the threaded section is threaded into the housing, any burrs that may be present are sheared off. Due to what may be a preferred position of the continuous threads in the top area of the threaded section, shearing off does not result in increased threading torque. Two complete threads may still be manufactured to dimension and usually demolded without any problems.

Powder metallurgical methods, in particular the MIM method, are known to those skilled in the art. In the MIM method, a suitable metal powder mixture is mixed with different organic and/or inorganic materials to make processing by an injection molding method possible. For example, the mixture may include, in addition to metal powder, one or more organic binders, which ensure the necessary properties, for example, thixotropy. After injection molding, in which a so-called "green compact" is formed, in a first heat treatment method (which may be fully or partially replaced by chemical methods) the binder material is removed fully or partially from the green compact, producing a so-called "brown compact."

In a subsequent heat treatment step, the brown compact is sintered, the metal particles partially fusing to each other during sintering, forming a solid (while also normally more porous) metallic body. Compared to conventional machining, this permits cost-effective manufacturing of a component. This cost-effective component, which may fully or partially include the external thread in particular, may then also be combined with other components, for example, with components that have been manufactured by other manufacturing methods. In this way, conventional technologies may be combined with powder metallurgical technologies.

The proposed plug-in sensor allows effective protection of the sealing surface and/or the remaining thread (depending on the position of the first threaded section) against corrosive media, without additional components (such as gaskets) being necessary therefor. A plurality of threaded sections may also be provided, for example, a first threaded section to protect the sealing surface and a second threaded section to protect other parts of the external thread against corrosive media. This permits, in particular by using the powder metallurgical method, a reliable, cost-effective, and durable plug-in sensor, which still meets or even exceeds all quality requirements, to be easily and rapidly manufactured. Complicated manual operations may be completely or partly omitted. The integrated splash protection or media protection by the at least one first threaded section considerably increases the service life compared to conventional plug-in sensors having continuous blow-out grooves. Thanks to this splash protection, splashing liquids are unable to reach the sealing surface, so that corrosion in this area is effectively prevented.

The plug-in sensor according to the present invention may be advantageously further improved via different exemplary embodiments. Thus, it may be, for example, that the at least one blow-out groove includes at least one flattening in the second threaded section. A "flattening" is understood here as a secant-shaped blow-out groove, i.e., an area in which the threads might rest on a secant plane.

It may furthermore be may be the case that the at least one sensor of the plug-in sensor includes at least one of the following sensors: a temperature sensor, in particular an NTC resistor, a pressure sensor (for example, a diaphragm pressure sensor, in particular a diaphragm pressure sensor manufactured by a microtechnological method), an air mass flow meter, in particular a hot-film air mass flow meter. As described previously, it may be in particular that the plug-in sensor is designed as a p-T sensor. For this purpose, a temperature sensor may be placed into a measuring finger situated obliquely to a sensor axis of the plug-in sensor, which protrudes into the fluid medium.

Also this measuring finger may be manufactured, for example, in the same operation as the manufacture of the at least one external thread, by a powder metallurgical method. It may be in particular that if the temperature sensor is at least approximately situated on the sensor axis, since this arrangement ensures that even if the plug-in sensor is threaded into the housing in a different way, the temperature sensor is always positioned inside the housing in an approximately identical manner. "At least approximately" is to be also understood here as an arrangement which slightly differs from this positioning, for example, an arrangement which differs from this positioning by no more than once or twice the maximum dimension of the temperature sensor.

Furthermore, the sensor body may be designed in such a way that it has a sealing cone on its side facing the fluid medium. As is known from the related art, this sealing cone additionally enhances the seal of the plug-in sensor or the seal of the inner space against the outer space. In this way, the sealing cone cooperates reliably with the sealing surface separate from this sealing cone.

In addition to the above-described plug-in sensor in one of the above-illustrated specific embodiments, a method for manufacturing a plug-in sensor for measuring at least one property of a fluid medium is also proposed, in particular a plug-in sensor of the above-described type in one of the above-illustrated specific embodiments. To this extent, reference may be largely made to the previous description regarding the specific embodiments of the plug-in sensor. The plug-in sensor has at least one sensor for detecting the at least one property. Furthermore, the plug-in sensor has at least one sensor body having an external thread for threading the plug-in sensor into a threaded borehole of a housing.

Furthermore, the plug-in sensor has at least one sealing surface for sealing an inner space of the housing against an outer space. The external thread, in turn, has at least two threaded sections; reference may be made to the above description regarding the design of the threaded sections. The method is designed in such a way that the plug-in sensor, in particular the at least one external thread, is manufactured entirely or partially with the aid of a powder metallurgical method, in particular with the aid of a metal injection molding method.

The exemplary embodiments and/or exemplary methods of the present invention is not, however, limited to p-T sensors of this type.

Exemplary embodiments of the present invention are illustrated in the drawings and explained in greater detail in the description that follows.

DETAILED DESCRIPTION

Figure 1:
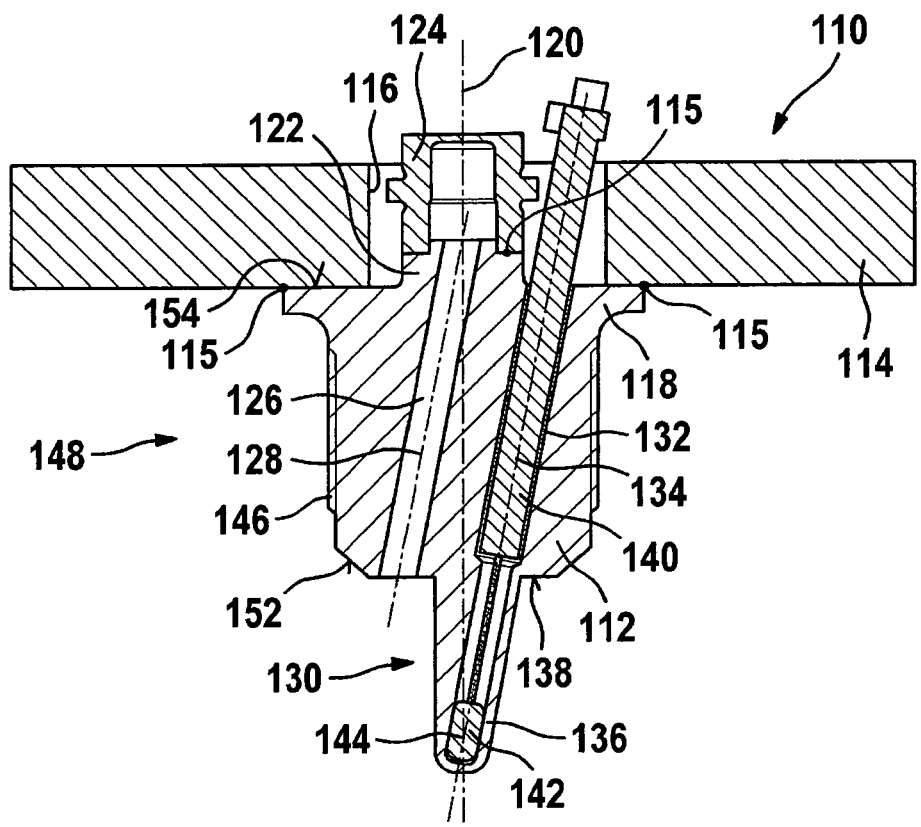
FIG. 1 shows a cross section through an exemplary embodiment of a plug-in sensor according to the present invention.

FIG. 1 shows an exemplary embodiment of a plug-in sensor 110 according to the present invention in a sectional view. Plug-in sensor 110 has a sensor body 112. A hexagonal body 114 having a central bore hole 116 is provided above sensor body 112. Sensor body 112 is connected to hexagonal body 114 which may be via an integral joint 115 (for example, a weld) in such a way that sensor body 112 is situated concentrically to central bore hole 116, and the top of sensor body 112 is accessible through central bore hole 116. In this way, electronic trigger components may be situated on the top of hexagonal body 114 in FIG. 1, for example, plug connections for contacting plug-in sensor 110.

The integral joints of the individual components are labeled in FIG. 1 by reference numeral 115 in general. For the purpose of an integral joint 115, sensor body 112 has on its top, between sensor body 112 and hexagonal body 114, a projection 118 facing hexagonal body 114 and having a contact surface 154.

Sensor body 112 has a sensor body axis 120. On the top end of sensor body 112, a sensor projection 122 is provided, which, in the assembled state of plug-in sensor 110, protrudes into central bore hole 116 and on which a pressure sensor 124 is mounted symmetrically to sensor body axis 120 and may also be connected by integral joint 115. For example, this may be, as described above, a diaphragm pressure sensor 124. Alternatively or additionally to the integral joint, other types of connection may also be used, for example, friction-locked connections such as threaded connections or positive connections.

A through bore hole 126 having a through bore hole axis 128 runs from projection 118 to end 130 of plug-in sensor 110 facing the fluid to be measured. Through bore hole axis 128 is inclined with respect to sensor body axis 120, forming with it an angle of approximately 10° (in this exemplary embodiment). Furthermore, there is a temperature sensor bore hole 132 having a temperature sensor bore hole axis 134 in sensor body 112. On its end 130 facing the fluid medium, this temperature sensor bore hole 132 ends in a measuring finger 136 as a blind bore hole, which protrudes into the fluid medium from an essentially circular face 138. Temperature sensor bore hole axis 134 is inclined with respect to sensor body axis 120, forming with it an angle of also approximately 10°. A temperature sensor 140, which has a temperature sensor element 142 at its bottom end, is accommodated in temperature sensor bore hole 132. This temperature sensor element may be an NTC resistor, for example. Temperature sensor element 142 is cast in temperature sensor bore hole 132 with the aid of a heat-conductive adhesive, for example, and is thus fixed and thermally coupled to measuring finger 136 at the same time. To reduce the heat loss via sensor body 112, in the ideal case the filling level of this heat-conductive adhesive is selected in such a way that only temperature sensor element 142 is sheathed by conductive adhesive.

The inclined position of temperature sensor bore hole 132 relative to sensor body axis 120 ensures that temperature sensor element 142 is located centrally in the medium flow, regardless of the orientation at which plug-in sensor 110 is introduced into the medium. Accordingly, in this exemplary embodiment, temperature sensor bore hole 132 is selected in such a way that temperature sensor element 142 is situated right in the middle over the point of intersection 144 between temperature sensor bore hole axis 134 and sensor body axis 120.

Plug-in sensor 110 is designed in such a way that it may be threaded into a plug-in sensor bore hole (not depicted) in a housing. For example, this plug-in sensor bore hole may be a bore hole in a housing of a pipe system of an air conditioning system, for example, of a $CO_2$ air conditioning system. Alternatively, other applications are conceivable, for example, an application in a gasoline direct injection fuel system. Measuring finger 136 protrudes into the fluid medium to be measured according to the application. Accordingly, the length of plug-in sensor 110, i.e., the depth at which point of intersection 144 is located within the fluid medium, is selected in such a way that this point of intersection 144 may be situated centrally in a flow pipe of the fluid medium.

To enable plug-in sensor 110 to be threaded into the plug-in sensor bore hole, sensor body 112 is provided with an external thread 146. This external thread 146 is illustrated in FIG. 1 only symbolically and is elucidated below with reference to FIGS. 2A and 2B. External thread 146 extends only over part of cylindrical outer surface 148 of sensor body 112.

A sealing surface which, in this exemplary embodiment, has the shape of a conical seal 152, is situated at the junction between cylindrical outer surface 148 and face 138 of sensor body 112. In this exemplary embodiment, a cone angle of approximately 45° is used. Other embodiments of the sealing surface are also possible, however. One advantage of this configuration of conical seal 152 on end 130 of plug-in sensor 110 facing the medium is in particular that conical seal 152 at least largely protects external thread 146 against influences from the interior of the housing, i.e., for example, against influences originating from the medium itself. For example, when used in a combustion chamber, an influence of combustion chamber gases may have a harmful effect on external thread 146, or other liquid, gaseous, or solid impurities may reach external thread 146 and permanently damage it.

However, this protection of external thread 146 extends only to the penetration of harmful impurities from the interior of the housing to thread 146. Another source of damage to external thread 146 is, however, represented by the top of plug-in sensor 110 in FIG. 1. Thus, projection 118 at the top end of sensor body 112 usually has no sealing function to the housing, so that a gap is normally formed between this projection 118 and the housing wall. Solid, liquid, or gaseous impurities from the engine compartment may reach external thread 146 from above through this gap, permanently damaging the external thread. For example, oils, salt water, splash water, battery acid, engine cleaning fluid, and other types of impurities of corrosive and non-corrosive nature may reach external thread 146 and/or even sealing surface 152, permanently damaging them. The sealing function may thus be considerably reduced in the long run, which may affect not only the functionality of plug-in sensor 110, but also the operating safety.

Accordingly, external thread 146 is designed according to the present invention so that it protects both external thread 146 itself and sealing surface 152. This design of external thread 146 is illustrated in detail in FIGS. 2A and 2B, which show different perspective views of plug-in sensor 110. In the illustrations of FIGS. 2A and 2B, again, only part of plug-in sensor 110 is illustrated. In this illustration, hexagonal body 114 is not shown.

It is apparent that, in the embodiment according to the present invention of plug-in sensor 110, external thread 146 is subdivided into two sections. A first, top threaded section 210 is provided with exactly two continuous threads 212 in this exemplary embodiment. This first threaded section prevents impurities capable of damaging the remaining thread and sealing surface 152 from penetrating from the top, i.e., for example, via a gap between projection 118 and the housing.

Figure 2A:
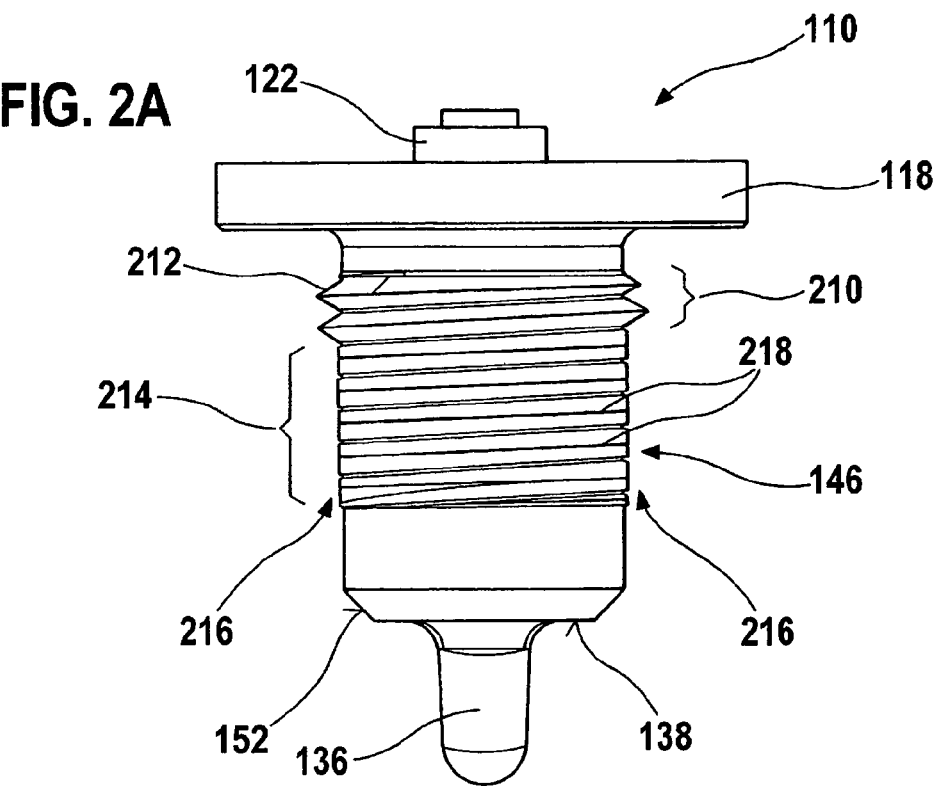
FIG. 2A shows a perspective view of a part of the plug-in sensor according to FIG. 1 and a detailed illustration of the threaded section.
Figure 2B:
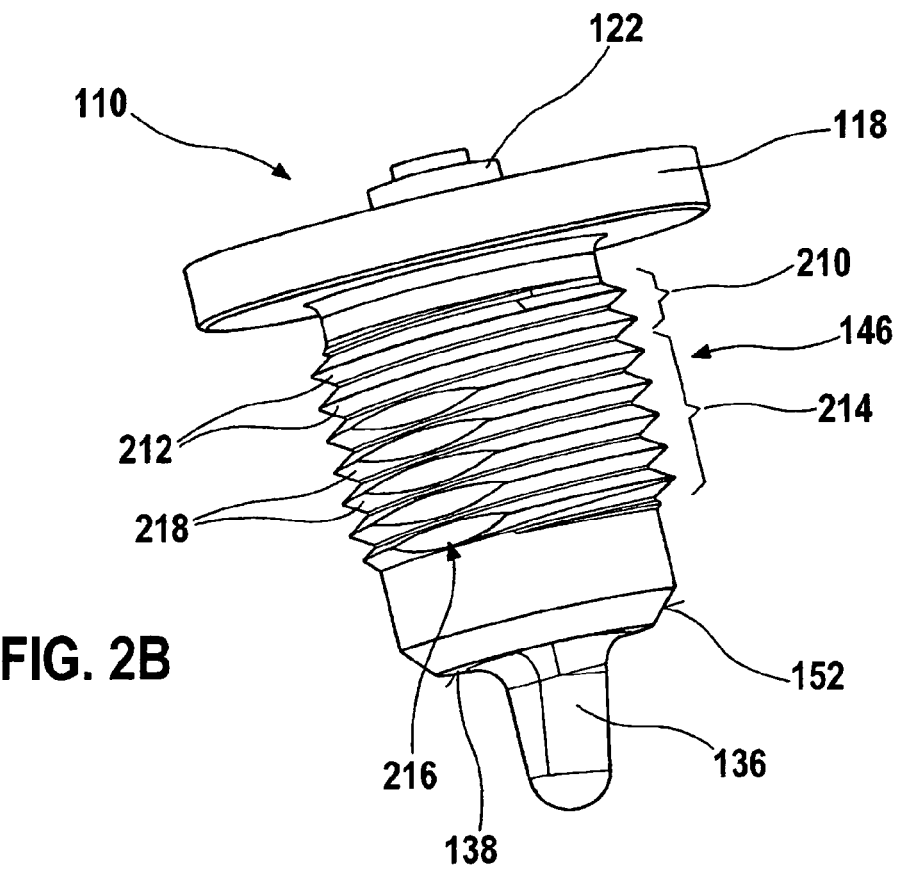
FIG. 2B shows a different perspective view of the part of the plug-in sensor according to FIG. 1 and a detailed illustration of the threaded section.

A second threaded section 214 is adjacent to this first threaded section 210 in the direction of face 138. Blow-out grooves 216 which, in this exemplary embodiment according to FIGS. 2A and 2B, are designed as flattenings in the thread, are provided in this second threaded section 214. These blow-out grooves allow gases such as air to escape when plug-in sensor 110 is threaded into the housing. In the exemplary embodiment depicted in FIGS. 2A and 2B, blow-out grooves 216 are shown diametrically opposing each other, exactly two blow-out grooves 216 being provided in the form of thread flattenings. In this second threaded section 214, uninterrupted threads 218 thus form there.

As illustrated above, it may be the case in particular to manufacture sensor body 112 fully or partially with the aid of a powder metallurgical method. In particular, a metal injection molding method may be used here to manufacture sensor body 112. The two continuous threads 212 may still be manufactured without problems and to dimension by the injection molding process. Due to the design of external thread 146, demolding may still be accomplished even with the aid of a simple tool, for example, a simple open-closed tool. Any burrs present formed due to the injection molding operation are usually sheared off when plug-in sensor 110 is threaded into the housing. Due to the position of continuous threads 212 of first threaded section 210 in the top area of external thread 146, this shearing off does not result in increased thread-in torque. Powder metallurgical methods and their execution are known to those skilled in the art, so that commercially available injection molding compounds, catalysts, demolding agents, and other chemicals and processes may be used.

Plug-in sensor 110 is only schematically illustrated in FIGS. 1, 2A, and 2B. Thus, in particular, other components of the plug-in sensor such as, for example, electrical connections to pressure sensor 124 and/or to temperature sensor element 142, are not shown. Accordingly, a housing, which may include, for example, a plug for contacting plug-in sensor 110 (for example, for supplying electric power and/or for picking up signals), and an electronic board having triggering and analyzing circuits, and other components, is provided on the top of hexagonal body 114, i.e., on the side opposite to end 130. For this embodiment, reference is made to Stefan Butzmann (publisher): "Sensorik im Kraftfahrzeug" [Automotive sensor systems] expert Verlag, 2006, p. 77.

What is claimed is:

1. A plug-in sensor for measuring at least one property of a fluid medium, for use in the coolant circuit of an air conditioning system of a motor vehicle, comprising:
    at least one sensor for detecting the at least one property;
    a sensor body having an external thread for threading the plug-in sensor into a threaded bore hole of a housing, and further having a sealing surface for sealing an inner space of the housing against an outer space, wherein the external thread has at least two threaded sections, including (i) a first threaded section having at least one continuous thread, and (ii) a second threaded section having at least one interrupted thread, at least one interruption of the at least one interrupted thread forming at least one blow-out groove.

2. The plug-in sensor of claim 1, wherein the second threaded section is situated between the first threaded section and the sealing surface.

3. The plug-in sensor of claim 1, wherein the first threaded section has between one and two continuous threads.

4. The plug-in sensor of claim 1, wherein the at least one blow-out groove includes at least one flattening in the second threaded section.

5. The plug-in sensor of claim 1, wherein the plug-in sensor is manufactured at least partially with the aid of at least one of a powder metallurgical process and a metal injection molding process.

6. The plug-in sensor of claim 1, wherein the external thread is manufactured by at least one of a powder metallurgical process and a metal injection molding process.

7. The plug-in sensor of claim 1, wherein the at least one sensor includes at least one of the following sensors: a temperature sensor; an NTC resistor; a pressure sensor; an air mass flow meter.

8. The plug-in sensor of claim 1, wherein the plug-in sensor is configured as a p-T sensor.

9. The plug-in sensor of claim 1, wherein the sealing surface has a conical seal on a side of the sensor body facing the fluid medium.

10. A plug-in sensor, for measuring at least one property of a fluid medium, for use in the coolant circuit of an air conditioning system of a motor vehicle, comprising:
    at least one sensor for detecting the at least one property;
    a sensor body having an external thread for threading the plug-in sensor into a threaded bore hole of a housing, and further having a sealing surface for sealing an inner space of the housing against an outer space, wherein the external thread has at least two threaded sections, including (i) a first threaded section having at least one continuous thread, and (ii) a second threaded section having at least one interrupted thread, at least one interruption of the at least one interrupted thread forming at least one blow-out groove;
    wherein a temperature sensor is accommodated in a measuring finger positioned at an inclination with respect to a sensor body axis of the plug-in sensor, the temperature sensor being situated at least approximately on the sensor body axis.

11. A method for manufacturing a plug-in sensor for measuring at least one property of a fluid medium, for use in the coolant circuit of an air conditioning system of a motor vehicle, the method comprising:
- manufacturing a plug-in sensor at least partially with the aid of at least one of a powder metallurgical process and a metal injection molding process;
- wherein the plug-in sensor includes at least one sensor for detecting the at least one property, the plug-in sensor further having a sensor body having an external thread for threading the plug-in sensor into a threaded bore hole of a housing, the plug-in sensor further having a sealing surface for sealing an inner space of the housing against an outer space, the external thread having at least two threaded sections, including (i) a first threaded section having at least one continuous thread, and (ii) a second threaded section having at least one interrupted thread, at least one interruption of the at least one interrupted thread forming at least one blow-out groove.

* * * * *

UNITED STATES PATENT AND TRADEMARK OFFICE
CERTIFICATE OF CORRECTION

PATENT NO. : 8,454,232 B2  Page 1 of 1
APPLICATION NO. : 12/733525
DATED : June 4, 2013
INVENTOR(S) : Stoll et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 586 days.

Signed and Sealed this
Eighth Day of September, 2015

Michelle K. Lee
*Director of the United States Patent and Trademark Office*